(12) United States Patent
Kaneko et al.

(10) Patent No.: US 12,038,235 B2
(45) Date of Patent: Jul. 16, 2024

(54) HEAT EXCHANGE CORE AND HEAT EXCHANGER

(71) Applicant: MITSUBISHI HEAVY INDUSTRIES, LTD., Tokyo (JP)

(72) Inventors: Takeshi Kaneko, Tokyo (JP); Koichi Tanimoto, Tokyo (JP); Hiroyuki Nakaharai, Tokyo (JP); Yoichi Uefuji, Tokyo (JP); Koichiro Iida, Tokyo (JP); Nobuhide Hara, Tokyo (JP); Masaya Hatanaka, Tokyo (JP); Masashi Kitamura, Tokyo (JP); Shunsaku Eguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 31 days.

(21) Appl. No.: 17/558,997

(22) Filed: Dec. 22, 2021

(65) Prior Publication Data

US 2022/0252350 A1      Aug. 11, 2022

(30) Foreign Application Priority Data

Feb. 5, 2021  (JP) ................... 2021-017039

(51) Int. Cl.
*F28D 1/053*   (2006.01)
*F28D 7/00*    (2006.01)
*F28D 1/02*    (2006.01)

(52) U.S. Cl.
CPC ....... *F28D 1/05391* (2013.01); *F28D 7/0058* (2013.01); *F28D 2001/0266* (2013.01); *F28D 2001/0273* (2013.01); *F28D 2001/028* (2013.01)

(58) Field of Classification Search
CPC .............. F28D 1/05391; F28D 7/0058; F28D 2001/0266; F28D 2001/0273; F28D 2001/028
(Continued)

(56) References Cited

U.S. PATENT DOCUMENTS

| 4,352,273 A | * | 10/1982 | Kinsell | ................. F28D 9/0062 165/166 |
| 5,309,637 A | | 5/1994 | Moriarty | |

(Continued)

FOREIGN PATENT DOCUMENTS

| CN | 110926256 | 3/2020 |
| DE | 11 2020 003 577 | 5/2022 |

(Continued)

OTHER PUBLICATIONS

Office Action dated Jul. 14, 2023 in corresponding DE application No. 102022200189.3, with English translation.

*Primary Examiner* — Raheena R Malik
(74) *Attorney, Agent, or Firm* — Wenderoth, Lind & Ponack, L.L.P.

(57) ABSTRACT

A heat exchange core according to one embodiment includes: a header flow path that extends in a first direction; and a plurality of branching flow paths that are connected to the header flow path and extend in a second direction intersecting with the first direction. A first angle formed by the header flow path with respect to a virtual connection plane between the header flow path and the plurality of branching flow paths is less than a second angle formed by the branching flow paths with respect to the connection plane.

7 Claims, 10 Drawing Sheets

(58) Field of Classification Search
USPC .......................................................... 165/173
See application file for complete search history.

(56) References Cited

U.S. PATENT DOCUMENTS

| | | | | |
|---|---|---|---|---|
| 6,250,380 | B1* | 6/2001 | Strahle | F28D 9/0043 |
| | | | | 165/166 |
| 6,364,007 | B1* | 4/2002 | Fischer | F28D 9/0037 |
| | | | | 165/170 |
| 9,618,278 | B2* | 4/2017 | Denkenberger | B21D 53/045 |
| 10,809,007 | B2* | 10/2020 | Martinez | F28D 7/0033 |
| 10,962,252 | B2* | 3/2021 | LePoudre | F24F 3/147 |
| 11,226,158 | B2* | 1/2022 | Streeter | F28F 9/0268 |
| 11,255,615 | B2* | 2/2022 | Streeter | F28F 9/0246 |
| 11,384,992 | B2* | 7/2022 | Suzuki | F28D 9/00 |
| 2010/0051248 | A1* | 3/2010 | Inatomi | F28F 3/04 |
| | | | | 165/166 |
| 2014/0231057 | A1* | 8/2014 | Schalansky | F28F 9/02 |
| | | | | 165/169 |
| 2015/0053381 | A1 | 2/2015 | Takada et al. | |
| 2016/0282064 | A1 | 9/2016 | Yoon et al. | |
| 2017/0023311 | A1* | 1/2017 | Urbanski | F28F 9/0268 |
| 2017/0089643 | A1* | 3/2017 | Arafat | F28F 7/02 |
| 2017/0146305 | A1* | 5/2017 | Kuczek | F28F 9/0268 |
| 2018/0010820 | A1 | 1/2018 | Hirsch et al. | |
| 2019/0024987 | A1 | 1/2019 | Moore et al. | |
| 2019/0277576 | A1 | 9/2019 | Toubiana | |
| 2022/0205738 | A1 | 6/2022 | Yang et al. | |
| 2022/0252352 | A1* | 8/2022 | Iida | F28D 7/0025 |
| 2022/0282929 | A1 | 9/2022 | Kameyama et al. | |

FOREIGN PATENT DOCUMENTS

| | | |
|---|---|---|
| JP | 5797328 | 10/2015 |
| JP | 6636575 | 1/2020 |
| JP | 2021-135038 | 9/2021 |

* cited by examiner

VIEWED ALONG LINE INDICATED BY ARROWS VII-VII

HEAT EXCHANGE CORE AND HEAT EXCHANGER

CROSS-REFERENCE TO RELATED APPLICATIONS

This application claims the benefit of priority to Japanese Patent Application Number 2021-017039 filed on Feb. 5, 2021. The entire contents of the above-identified application are hereby incorporated by reference.

TECHNICAL FIELD

The present disclosure relates to a heat exchange core and a heat exchanger.

RELATED ART

For example, a heat exchange element (heat exchange core) for performing heat exchange between two fluids includes a plurality of flow path groups that extend along flow directions of the fluids. The two fluids exchange heat through a partition wall and the like separating the two fluids, while flowing in the plurality of flow path groups (see JP 5797328 B, for example).

SUMMARY

For example, it is conceivable to configure a header space to which open ends of the plurality of flow path groups in the heat exchange element described in JP 5797328 B face, to make the fluids flow into the plurality of flow path groups from the header space. To improve the heat exchange efficiency, variations in the flow rate among the flow paths in the heat exchange element need to be suppressed.

In order to suppress the variations in the flow rate among the flow paths, a header space of a certain amount of volume is required. However, due to a demand for downsizing a device including the heat exchange element, the variations in the flow rate among the flow paths have been demanded to be achieved with the size of the header space reduced as much as possible.

In view of the circumstances described above, an object of at least one embodiment of the present disclosure is to realize a heat exchange core featuring a compact size and excellent heat exchange efficiency.

(1) A heat exchange core according to at least one embodiment of the present disclosure includes:
a header flow path extending in a first direction; and
a plurality of branching flow paths connected to the header flow path and extending in a second direction intersecting with the first direction, in which a first angle formed by the header flow path with respect to a virtual connection plane between the header flow path and the plurality of branching flow paths is less than a second angle formed by the plurality of branching flow paths with respect to the connection plane.

(2) A heat exchanger according to at least one embodiment of the present disclosure includes the heat exchange core with the configuration (1) described above.

With at least one embodiment of the present disclosure, a heat exchange core featuring a compact size and excellent heat exchange efficiency can be obtained.

BRIEF DESCRIPTION OF DRAWINGS

The disclosure will be described with reference to the accompanying drawings, wherein like numbers reference like elements.

DESCRIPTION OF EMBODIMENTS

Figure 1:
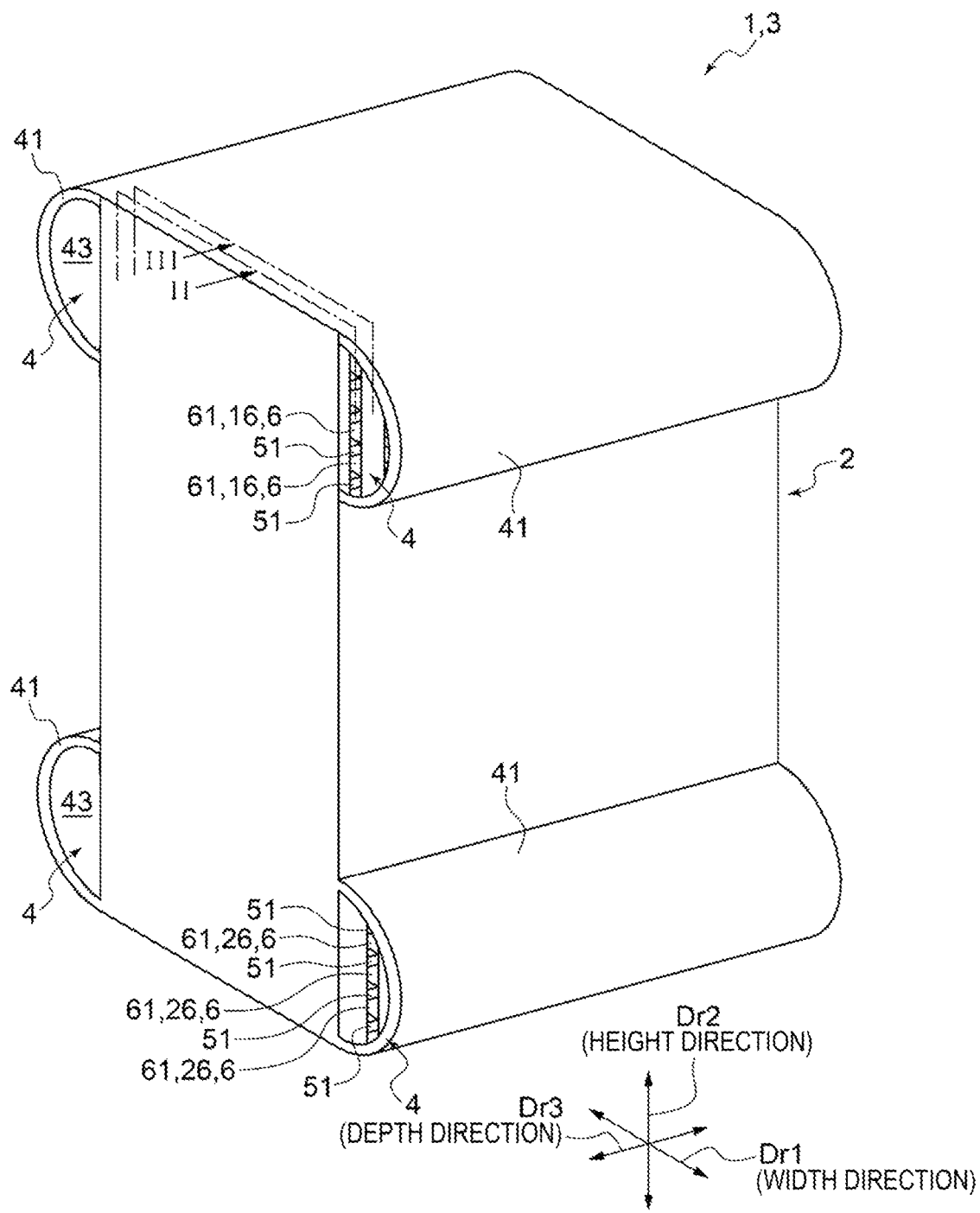
FIG. 1 is a schematic perspective view of a heat exchange core in a heat exchanger according to some embodiments.

Hereinafter, some embodiments of the present disclosure will be described with reference to the accompanying drawings. However, dimensions, materials, shapes, relative arrangements, or the like of components described in the embodiments or in the drawings are not intended to limit the scope of the present disclosure thereto, and are merely illustrative examples.

For instance, an expression indicating relative or absolute arrangement such as "in a direction", "along a direction", "parallel", "orthogonal", "centered", "concentric" or "coaxial" shall not be construed as indicating only the arrangement in a strict literal sense, but also includes a state where the arrangement is relatively displaced by a tolerance, or by an angle or a distance within a range in which the same function can be achieved.

For instance, an expression indicating an equal state such as "same", "equal", or "uniform" shall not be construed as indicating only a state in which features are strictly equal, but also includes a state in which there is a tolerance or a difference within a range in which the same function can be achieved.

Further, for instance, an expression indicating a shape such as a rectangular shape or a cylindrical shape shall not be construed as only being a geometrically strict shape, but also includes a shape with unevenness, chamfered corners or the like within a range in which the same effect can be achieved.

On the other hand, an expression such as "comprise", "include", "have", "contain" or "constitute" is not intended to be exclusive of other constituent elements.

FIG. 1 is a schematic perspective view of a heat exchange core in a heat exchanger according to some embodiments.

Figure 2:
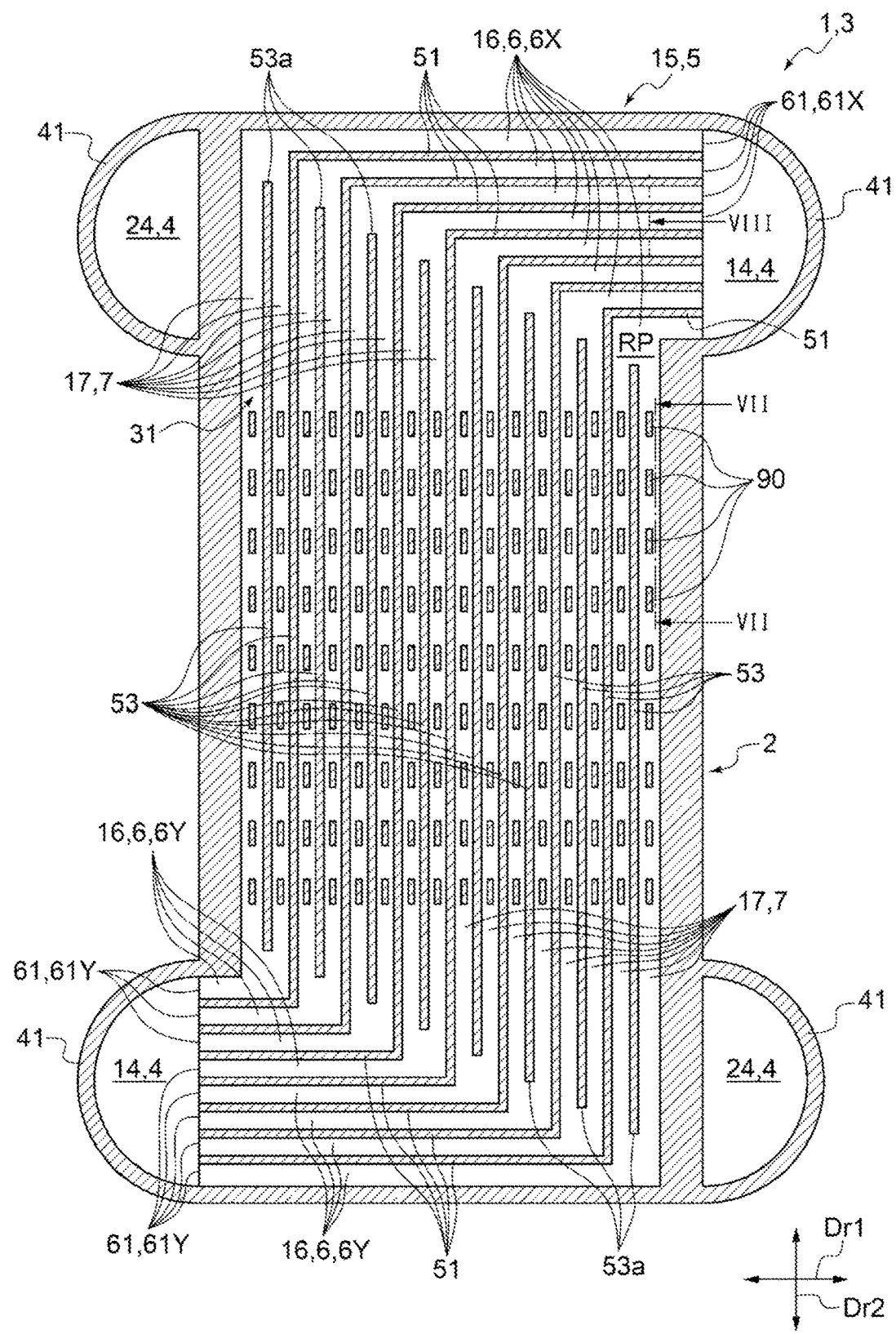
FIG. 2 is a cross-sectional view taken along the line indicated by arrow II in FIG. 1.

FIG. 2 is a cross-sectional view taken along the line indicated by arrow II in FIG. 1.

Figure 3:
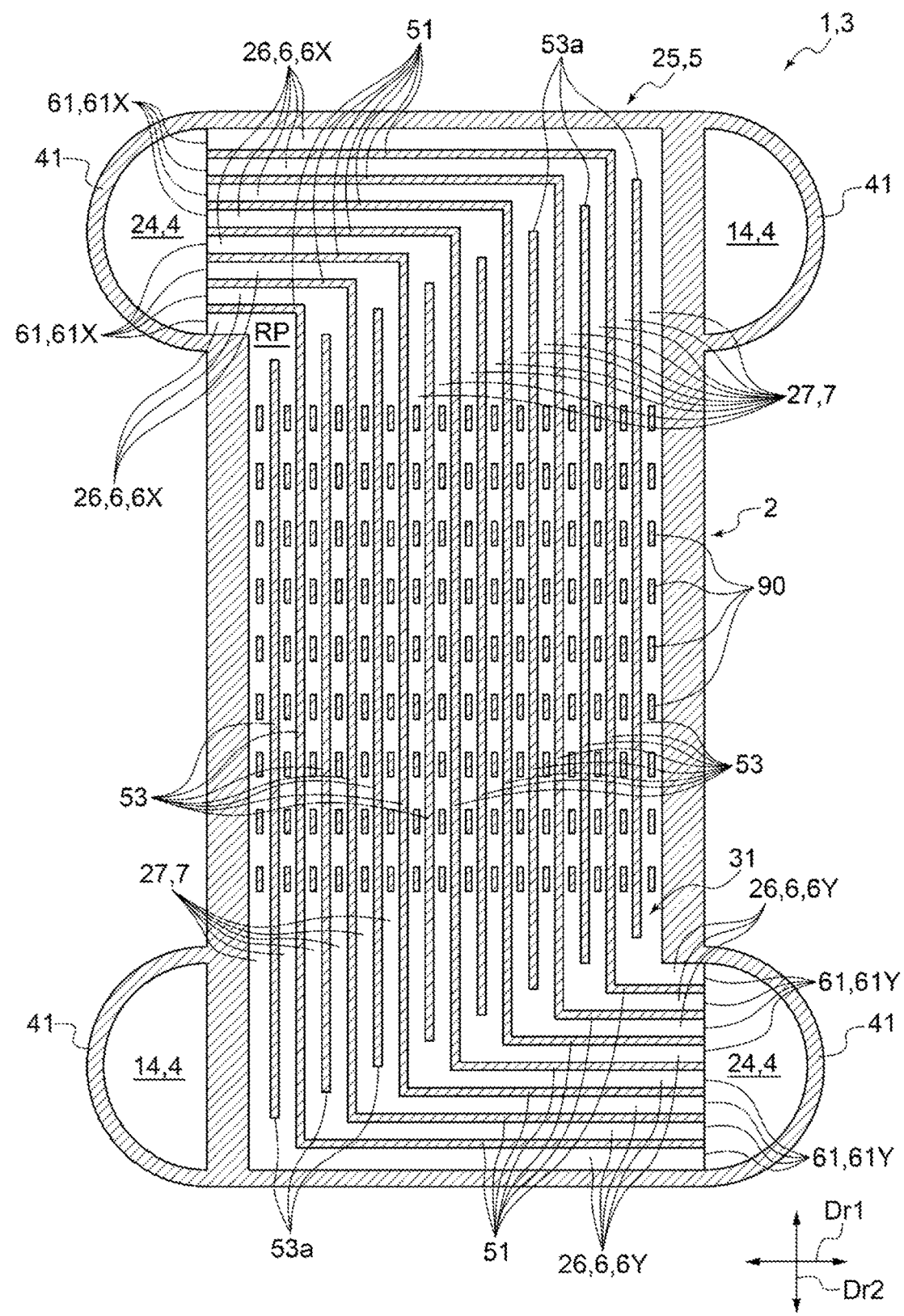
FIG. 3 is a cross-sectional view taken along the line indicated by arrow III in FIG. 1.

FIG. 3 is a cross-sectional view taken along the line indicated by arrow III in FIG. 1.

Figure 4:
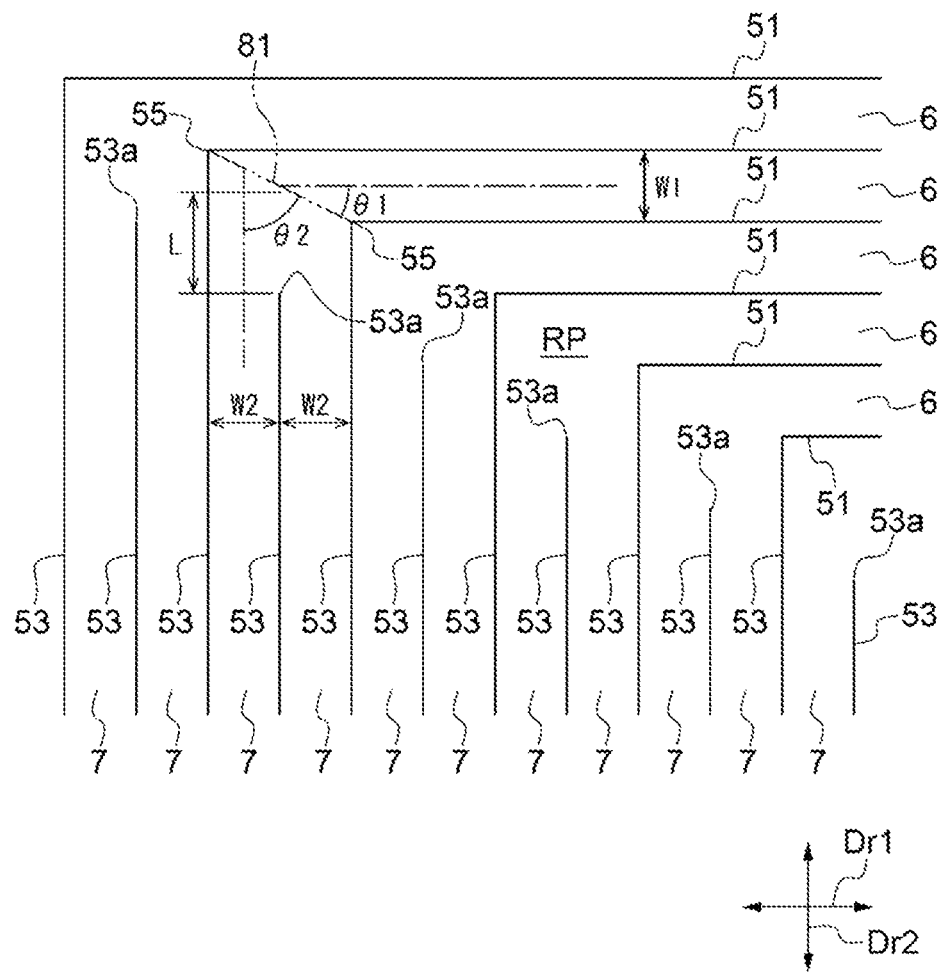
FIG. 4 is a schematic view for explaining a connection plane, a first angle, and a second angle.

FIG. 4 is a schematic view for explaining a connection plane, a first angle, and a second angle.

Figure 5:
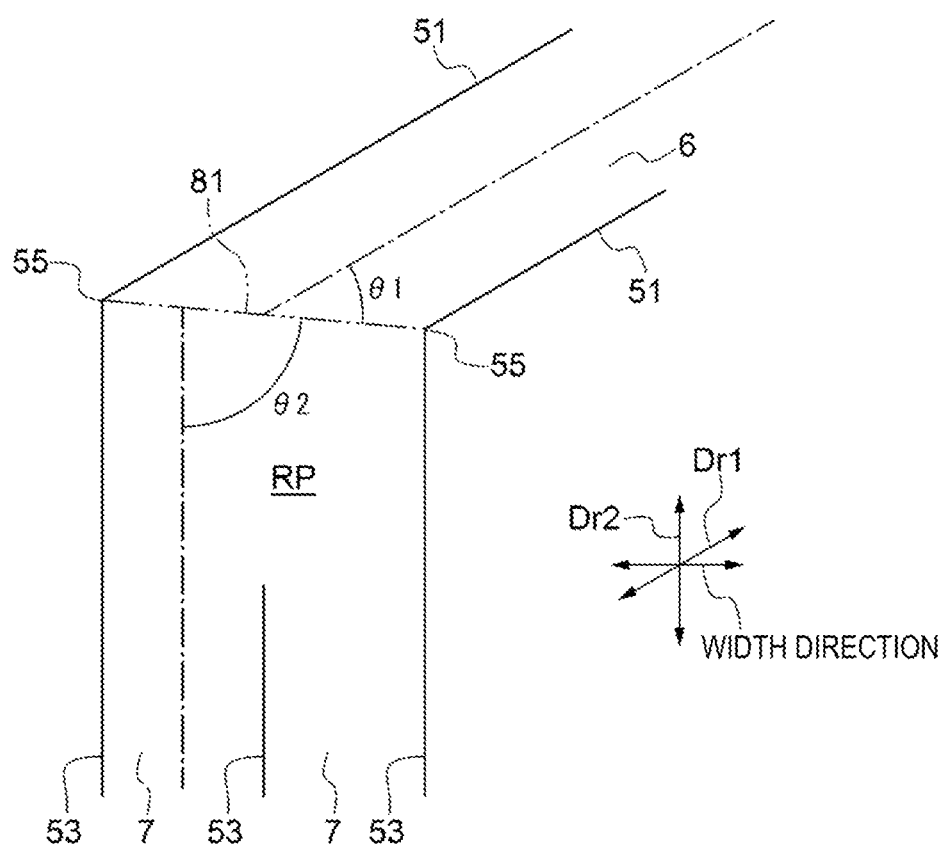
FIG. 5 is a schematic view for explaining the connection plane, the first angle, and the second angle.

FIG. 5 is a schematic view for explaining the connection plane, the first angle, and the second angle.

Figure 6:
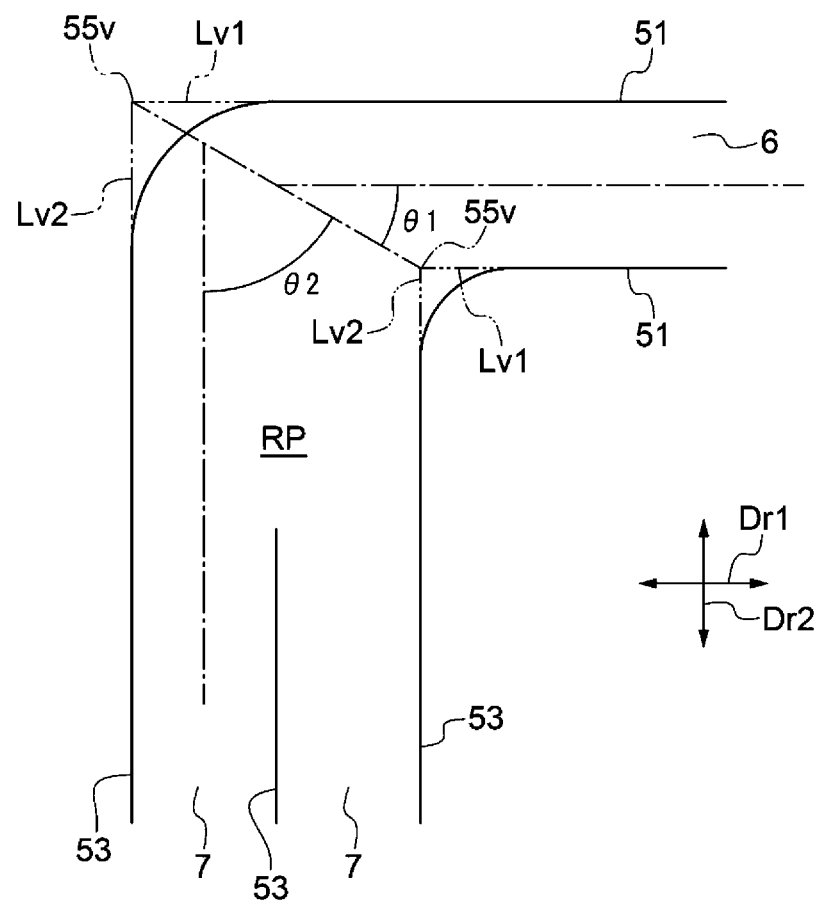
FIG. 6 is a schematic view for explaining the connection plane, the first angle, and the second angle.

FIG. 6 is a schematic view for describing the connection plane, the first angle, and the second angle.

A heat exchange core 1 illustrated in FIG. 1 is used in a heat exchanger 3 in which a first fluid and a second fluid exchange heat.

The heat exchange core 1 according to some embodiments includes an outer header flow path 4 formed outside a core case 2, and a plurality of flow path layers 5 inside the core case 2.

The outer header flow path 4 according to some embodiments includes a first outer header flow path 14 and a second outer header flow path 24 that is not in communication with the first outer header flow path 14.

The plurality of flow path layers 5 include a plurality of first flow path layers 15 and a plurality of second flow path layers 25.

The schematic cross-sectional view illustrated in FIG. 2 is a diagram illustrating a schematic cross section of the first flow path layers 15. The schematic cross-sectional view illustrated in FIG. 3 is a diagram illustrating a schematic cross section of the second flow path layers 25.

The flow path layers 5 according to some embodiments include the plurality of first flow path layers 15 and the plurality of second flow path layers 25 alternately arranged in the stacking direction of the layers 15 and 25. The first flow path layer 15 and the second flow path layer 25 are separated by an interlayer partition wall 31.

The flow path layer 5 according to some embodiments includes a plurality of inner header flow paths 6 connected to the outer header flow path 4 and a plurality of branching flow paths 7 each connected to a corresponding one of the plurality of inner header flow paths 6.

More specifically, the first flow path layer 15 according to some embodiments includes a plurality of first inner header flow paths 16 connected to the first outer header flow path 14 and a plurality of first branching flow paths 17 each connected to a corresponding one of the plurality of first inner header flow paths 16.

Similarly, the second flow path layer 25 according to some embodiments includes a plurality of second inner header flow paths 26 connected to the second outer header flow path 24 and a plurality of second branching flow paths 27 each connected to a corresponding one of the plurality of second inner header flow paths 26.

The flow path layer 5 according to some embodiments is a flow path layer extending along a reference plane RP extending in a first direction Dr1 and a second direction Dr2, which will be described later. In other words, the reference plane RP can be regarded as a plane that includes the inner header flow path 6 and a plurality of branching flow paths.

The first fluid and the second fluid may each be a liquid or a gas, and generally have temperature differing therebetween. Although not limited, a portion inside the core case 2 of the heat exchange core 1 excluding the first outer header flow path 14 and the second outer header flow path 24 may have a rectangular parallelepiped shape, for example.

The heat exchange core 1 illustrated in FIG. 1 may be used, for example, in a state where the heat exchanger 3 is attached to a case (not illustrated). Furthermore, the heat exchange core 1 illustrated in FIG. 1 may be used without being attached to the case, and may be used in a state of being installed on a frame, in a state of being supported by a pipe (not illustrated) connected to the heat exchange core 1, or in the other like states. In this case, the heat exchange core 1 illustrated in FIG. 1 itself serves as the heat exchanger 3.

For convenience of explanation, the width direction, the height direction, and the depth direction of the heat exchange core 1 according to the embodiment are defined as follows.

The depth direction of the heat exchange core 1 according to some embodiments is defined as the stacking direction of the layers 15 and 25.

The height direction of the heat exchange core 1 according to some embodiments is defined as the second direction Dr2 described later which is a direction orthogonal to the depth direction and is a direction in which the plurality of branching flow paths 7 extend. The first direction Dr1 will be described later.

The width direction of the heat exchange core 1 according to some embodiments is defined as a direction orthogonal to the depth direction and the height direction.

The depth direction of the heat exchange core 1 according to some embodiments, that is, the stacking direction of the layers 15 and 25 is also referred to as a third direction Dr3.

Outer Header Flow Path 4

In the heat exchange core 1 according to some embodiments, the outer header flow path 4 is a header flow path extending along the depth direction (third direction Dr3) of the heat exchange core 1. In the heat exchange core 1 according to some embodiments, the outer header flow paths 4 are formed around both ends, in the second direction Dr2, of each of two side surfaces, of the core case 2 having the rectangular parallelepiped shape, facing each other while being separated from each other in the first direction Dr1.

In the heat exchange core 1 according to some embodiments, in FIG. 2 and FIG. 3, the first outer header flow paths 14 are formed on the upper right and lower left sides of the drawing, and the second outer header flow paths 24 are formed on the upper left and lower right sides of the drawing.

In the heat exchange core 1 according to some embodiments, the first outer header flow paths 14 and the second outer header flow paths 24 all have the same configuration. Therefore, in the following description, the first outer header flow paths 14 and the second outer header flow paths 24 will be simply referred to as the outer header flow path 4, when they do not need to be distinguished from each other.

The outer header flow path 4 according to some embodiments is a header flow path having a semicircular cross-sectional shape as viewed in the third direction Dr3. A flow path-forming wall portion 41 forming the outer header flow path 4 has a shape like a circular tube split in half along the longitudinal direction.

In the heat exchange core 1 according to some embodiments, the flow path-forming wall portion 41 may be joined, by welding, to the core case 2 formed by, for example, an additive manufacturing method.

In the heat exchange core 1 according to some embodiments, an opening 43, through which the outer header flow path 4 communicates with the outside of the heat exchange core 1, is formed at an end portion of the outer header flow path 4 in the third direction Dr3. The opening 43 is a communication port for making the fluid flow between the outer header flow path 4 and the space outside the heat exchange core 1. Note that the opening 43 that is not used is closed by a lid (not illustrated).

Inner Header Flow Path 6

In the heat exchange core 1 according to some embodiments, each of the plurality of inner header flow paths 6 is a header flow path that extends in the first direction Dr1 that intersects with the stacking direction of the layers 15 and 25.

Thus, in the heat exchange core 1 according to some embodiments, each of the first inner header flow path 16 and the second inner header flow path 26 extends in the first direction Dr1.

Note that, as illustrated in FIGS. 2 and 3, in the heat exchange core 1 according to some embodiments, the first direction Dr1 is preferably a direction orthogonal to the stacking direction (third direction Dr3) of the layers 15 and 25. In the following description, the first direction Dr1 is assumed to be a direction orthogonal to the third direction Dr3.

In the heat exchange core 1 according to some embodiments, a plurality of the inner header flow paths 6 are formed on each of both end sides in the height direction (second direction Dr2) of the heat exchange core 1 in each of the flow path layers 5. The inner header flow paths 6 are arranged side by side in the second direction Dr2 in each of the flow path layers 5. The inner header flow paths 6 adjacent to each other in the second direction Dr2 are separated by an inter-flow path partition wall 51 that extends in the first direction Dr1. In the following description, the inter-flow path partition wall 51 is also referred to as a first inter-flow path partition wall 51.

In the heat exchange core 1 according to some embodiments, each inner header flow path 6 is defined by the interlayer partition wall 31 and the inter-flow path partition wall 51.

Each inner header flow path 6 has an open end 61 facing the outer header flow path 4. Each of the inner header flow paths 6 according to some embodiments is in communication with the outer header flow path 4 through the open end 61.

Thus, each of the first inner header flow paths 16 according to some embodiments is in communication with the first outer header flow path 14 through the open end 61. Similarly, each of the second inner header flow paths 26 according to some embodiments is in communication with the second outer header flow path 24 through the open end 61.

In the heat exchange core 1 according to some embodiments, the first inner header flow paths 16 and the second inner header flow paths 26 all have the same configuration. Therefore, in the following description, the first inner header flow paths 16 and the second inner header flow paths 26 will be simply referred to as the inner header flow path 6, when they do not need to be distinguished from each other.

In the heat exchange core 1 according to some embodiments, the branching flow path 7 described below is connected to an end portion of each inner header flow path 6 opposite to the open end 61.

Note that, as illustrated in FIGS. 2 and 3, in the heat exchange core 1 according to some embodiments, the first direction Dr1 may be a direction orthogonal to the second direction Dr2 which is the extending direction of each branching flow path 7. In the following description, the first direction Dr1 is assumed to be a direction orthogonal to the second direction Dr2. Note that the first direction Dr1 may not be a direction orthogonal to the second direction Dr2.

Branching Flow Path 7

In the heat exchange core 1 according to some embodiments, each of the plurality of branching flow paths 7 extends in the second direction Dr2 that intersects with the first direction.

In the heat exchange core 1 according to some embodiments, each of the first branching flow path 17 and the second branching flow path 27 extends in the second direction Dr2.

For convenience of explanation, the stacking direction of the layers 15 and 25 is defined as the third direction Dr3.

The first direction Dr1, the second direction Dr2, and the third direction Dr3 are orthogonal to each other.

In the heat exchange core 1 according to some embodiments, the plurality of branching flow paths 7 are arranged side by side in the first direction Dr1 in each of the flow path layers 5. The branching flow paths 7 adjacent to each other in the first direction Dr1 are separated by an inter-flow path partition wall 53 that extends in the second direction Dr2. In the following description, the inter-flow path partition wall 53 is also referred to as a second inter-flow path partition wall 53.

In the heat exchange core 1 according to some embodiments, each branching flow path 7 is defined by the interlayer partition wall 31 and the inter-flow path partition wall 53.

In the heat exchange core 1 according to some embodiments, each of the plurality of branching flow paths 7 is connected to the inner header flow paths 6 on one side and the other side in the second direction Dr2.

In the heat exchange core 1 according to some embodiments, the plurality of branching flow paths 7 adjacent to each other in the first direction are connected to the same inner header flow path 6 on each of one side and the other side in the second direction Dr2. In other words, in the heat exchange core 1 according to some embodiments, a plurality of branching flow paths 7 are connected to one inner header flow path 6. Specifically, in the heat exchange core 1 according to some embodiments, two branching flow paths 7 adjacent to each other in the first direction are connected to one inner header flow path 6. In the heat exchange core 1 according to some embodiments, three branching flow paths 7 adjacent to each other in the first direction may be connected to one inner header flow path 6.

In the heat exchange core 1 according to some embodiments, as illustrated in FIG. 2 and FIG. 3, the first flow path layer 15 and the second flow path layer 25 are configured to be symmetrical in the left and right direction in FIG. 2 and FIG. 3.

Flow of Fluid

In the heat exchange core 1 according to some embodiments described above, the first fluid and the second fluid flow in the heat exchange core 1 in the following manner. For convenience of explanation, the first fluid flows into the first outer header flow path 14 on the upper side in FIGS. 1, 2, and 3. The second fluid flows into the second outer header flow path 24 on the lower side in FIGS. 1, 2, and 3. In this case, the first fluid and the second fluid flow in opposite directions in the heat exchange core 1 as described below.

Flow of First Fluid

The first fluid flows from the opening 43 formed in the upper portion of the core case 2 in FIG. 1 to the first outer header flow path 14 on the upper side in FIGS. 1, 2, and 3.

The first fluid that has flowed into the first outer header flow path 14 flows into each of the first inner header flow paths 16 on the upper side in FIG. 2 through the respective open ends 61 facing the first outer header flow path 14, in each of the first flow path layers 15. Thus, the first fluid that has flowed into the first outer header flow path 14 is distributed to each of the first flow path layers 15, and is distributed to each of the first inner header flow paths 16 in each of the first flow path layers 15.

The first fluid that has flowed into each of the first inner header flow paths 16 flows in the first inner header flow path 16 and into each of the first branching flow paths 17 from the respective end portions on the upper side in FIG. 2.

Thus, the first fluid that has flowed into each of the first inner header flow paths 16 is further distributed to each of the first branching flow paths 17.

The first fluid that has flowed into each of the first branching flow paths 17 flows in the first branching flow paths 17 toward the lower side in FIG. 2, and flows into the first inner header flow paths 16 on the lower side in FIG. 2 through the respective end portions on the lower side in FIG. 2. The first fluid that has flowed into the first inner header flow paths 16 flows into the first outer header flow paths 14 from the respective open ends 61 facing the first outer header flow paths 14 on the lower side in the drawing.

The first fluid that has flowed into the first outer header flow paths 14 flows to the outside from any of the openings 43 formed in a lower portion of the core case 2 illustrated in FIG. 1.

Flow of Second Fluid

The second fluid flows from the opening 43 formed in the lower portion of the core case 2 in FIG. 1 to the second outer header flow path 24 on the lower side in FIGS. 1, 2, and 3.

The second fluid that has flowed into the second outer header flow path 24 flows into each of the second inner header flow paths 26 on the lower side in FIG. 3 through the respective open ends 61 facing the second outer header flow paths 24 in each of the second flow path layers 25. Thus, the second fluid that has flowed into the second outer header flow path 24 is distributed to each of the second flow path layers 25, and is distributed to each of the second inner header flow paths 26 in each of the second flow path layers 25.

The second fluid that has flowed into each of the second inner header flow paths 26 flows in the respective second inner header flow path 26 and into each of the second branching flow paths 27 from the respective end portions on the lower side in FIG. 3.

Thus, the second fluid that has flowed into each of the second inner header flow paths 26 is further distributed to each of the second branching flow paths 27.

The second fluid that has flowed into each of the second branching flow paths 27 flows in each of the second branching flow paths 27 toward the upper side in FIG. 3, and flows into the second inner header flow paths 26 on the upper side in FIG. 3 through the respective end portions on the upper side in FIG. 3. The second fluid that has flowed into the second inner header flow paths 26 flows into the second outer header flow paths 24 from the respective open ends 61 facing the second outer header flow paths 24 on the upper side in the drawing.

The second fluid that has flowed into the second outer header flow path 24 flows to the outside from any of the openings 43 formed in an upper portion of the core case 2 illustrated in FIG. 1.

When the second fluid flows into the second outer header flow path 24 on the upper side in FIGS. 1, 2, and 3, the first fluid and the second fluid flow in parallel to each other in the heat exchange core 1.

Heat Exchange in Heat Exchange Core 1

In the heat exchange core 1 according to some embodiments, the first fluid flowing toward the lower side in FIGS. 1, 2, and 3 in each of the first branching flow paths 17 and the second fluid flowing toward the upper side in FIGS. 1, 2, and 3 in each of the second branching flow paths 27 exchange heat through the interlayer partition wall 31.

Furthermore, in the heat exchange core 1 according to some embodiments, the first fluid flowing in each of the first inner header flow paths 16 and the second fluid flowing in each of the second inner header flow paths 26 exchange heat through the interlayer partition wall 31.

Connection State Between Inner Header Flow Path 6 and Branching Flow Path

In the heat exchange core 1 according to some embodiments, the inner header flow path 6 and the branching flow path 7 are connected in a state as described below.

Here, a virtual connection plane between the inner header flow path 6 and the branching flow path 7 will be described.

FIG. 4, FIG. 5, and FIG. 6 schematically illustrate a connection state between the inner header flow path 6 and the branching flow path 7 as viewed in the third direction Dr3.

FIG. 4 illustrates a case in which the intersection angle between the inner header flow path 6 and the branching flow path 7 is 90 degrees.

FIG. 5 illustrates an example of a case in which the intersection angle between the inner header flow path 6 and the branching flow path 7 is an angle different from 90 degrees.

FIG. 6 illustrates a case in which the inter-flow path partition wall 51 defining the inner header flow path 6 and the inter-flow path partition wall 53 defining the branching flow path 7 are smoothly connected by a curved surface.

FIG. 5 and FIG. 6 only illustrate one inner header flow path 6 and two branching flow paths connected to the inner header flow path 6.

As illustrated in FIG. 4 and FIG. 5, a virtual connection plane 81 between the inner header flow path 6 and the branching flow path 7 is a virtual plane that includes two intersection portions 55 at which two first inter-flow path partition walls 51 positioned so as to sandwich the inner header flow path 6 and two second inter-flow path partition walls 53 connected to the two first inter-flow path partition walls 51 intersect, and extends in the third direction Dr3.

Note that, when the first inter-flow path partition wall 51 and the second inter-flow path partition wall 53 are smoothly connected by a curved surface as illustrated in FIG. 6, the connection plane 81 is defined as follows. Specifically, virtual straight lines Lv1 that are extensions, in the first direction Dr1, of the two first inter-flow path partition walls 51 positioned to sandwich the inner header flow path 6 are taken into consideration. Furthermore, virtual straight lines Lv2 that are extensions, in the second direction Dr2, of the two second inter-flow path partition walls 53 connected to these two inter-flow path partition walls 51 are taken into consideration. The virtual plane including two intersection portions 55v between the straight line Lv1 and the straight line Lv2 and extending in the third direction Dr3 is defined as the connection plane 81.

In the heat exchange core 1 according to some embodiments, a first angle θ1 formed by the inner header flow path 6 with respect to the virtual connection plane 81 between the inner header flow path 6 and the plurality of branching flow paths 7 is less than a second angle θ2 formed by the branching flow path 7 with respect to the connection plane 81.

In the heat exchange core 1 according to some embodiments, with the first angle θ1 described above thus set to be less than the second angle θ2 described above, a flow path width W1 of the inner header flow path 6 connected to the connection plane 81 can be made less than the sum (2×W2 for example) of flow path widths W2 of the plurality of branching flow paths 7 connected to the connection plane 81. With this configuration, the heat exchange core 1 can be downsized with the size of the core case 2 in the second direction Dr2 made small.

When the fluid flows from the inner header flow path 6 into each of the plurality of branching flow paths 7, because the sum of the flow path widths W2 of the plurality of respective branching flow paths 7 connected to the connection plane 81 is greater than the flow path width W1 of the inner header flow path 6 connected to the connection plane 81, variations in flow rate among the plurality of branching flow paths 7 are easily suppressed, and heat exchange efficiency is easily improved.

Therefore, the heat exchange core 1 according to some embodiments is suitable for realizing the heat exchange core 1 featuring a compact size and excellent heat exchange efficiency.

With the heat exchanger 3 provided with the heat exchange core 1 according to some embodiments, the heat exchanger 3 featuring a compact size and excellent heat exchange efficiency can be realized.

Position of In-Flow Path End Portion 53a of Second Inter-Flow Path Partition Wall 53

In some embodiments, an end portion (in-flow path end portion 53a) of the second inter-flow path partition wall 53 separating the plurality of branching flow paths 7 connected to one inner header flow path 6 among the second inter-flow path partition walls 53 may be positioned to be separated from the connection plane 81 in the second direction Dr2.

Through diligent research, the inventors have found out that with the in-flow path end portion 53a positioned to be separated from the connection plane 81 in the second direction Dr2, a difference, among the branching flow paths, in flow rate of the fluid flowing from the inner header flow paths 6 into the respective branching flow paths 7 can be suppressed.

Thus, with the heat exchange core 1 according to some embodiments, the difference in flow rate among the branching flow paths 7 can be suppressed.

In the heat exchange core 1 according to some embodiments, a distance L between the in-flow path end portion 53a and the connection plane 81 may be 0.3 times or more and 2 times or less of the flow path width W1 of the inner header flow path 6 as viewed in a direction orthogonal to a reference plane PR including the inner header flow path 6 and the plurality of branching flow paths 7, that is, in the third direction Dr3.

Through diligent research, the inventors have found out that with the distance L between the in-flow path end portion 53a and the connection plane 81 is 0.3 times or more and 2 times or less of the flow path width W1 of the inner header flow path 6 as viewed in the third direction Dr3, a difference, among the branching flow paths 7, in flow rate of the fluid flowing from the inner header flow paths 6 into the respective branching flow paths 7 can be effectively suppressed.

Thus, with the heat exchange core 1 according to some embodiments, the difference in flow rate among the branching flow paths 7 can be effectively suppressed.

With the heat exchange core 1 according to some embodiments described above, the following effects can be further obtained.

For example, in the heat exchange core 1 according to some embodiments, the total area (for example 2×S2) of flow path cross-sectional areas S2 of the plurality of respective branching flow paths 7 may be larger than a flow path cross-sectional area S1 of the inner header flow path 6 to which the plurality of branching flow paths 7 are connected.

This configuration facilitates the suppression of the variations in flow rate among the plurality of branching flow paths 7.

Additionally, in the heat exchange core 1 according to some embodiments, in each of the flow path layers 5, a total area ΣS2 of the flow path cross-sectional areas S2 of the plurality of branching flow paths 7 included in the flow path layer 5 may be larger than a total area ΣS1 of the flow path cross-sectional areas S1 of the plurality of inner header flow paths 6 included in the flow path layer 5.

With this configuration, improvement in the heat exchange efficiency of the heat exchange core 1 and the downsizing of the heat exchange core 1 can both be achieved.

In the heat exchange core 1 according to some embodiments, the plurality of inner header flow paths 6 may include a plurality of one side header flow paths 6X (for example, the inner header flow paths 6 on the upper side in FIG. 1) connected to the plurality of branching flow paths 7 on one side in the second direction Dr2, and a plurality of other side header flow paths 6Y (for example, the inner header flow paths 6 on the lower side in FIG. 1) connected to the plurality of branching flow paths 7 on the other side in the second direction Dr2. A total length Lt of the flow path lengths of the one side header flow paths 6X, the plurality of branching flow paths 7 connected to the one side header flow paths 6X, and the other side header flow paths 6Y connected to the one side header flow paths 6X via the plurality of branching flow paths 7 may be substantially the same among the flow path layers 5.

With this configuration, a difference in flow rate among the branching flow paths can be suppressed over the entirety of the flow path layers.

In the heat exchange core 1 according to some embodiments, one side end portions (one side open ends 61X) of the plurality of one side header flow paths 6X on the side opposite to the connection plane 81 may be positioned on the side opposite to other side end portions (other side open ends 61Y) of the plurality of other side header flow paths 6Y on the side opposite to the connection plane 81, in the first direction Dr1.

This configuration achieves a reasonable flow path layout for achieving substantially the same total length of the flow path lengths of the one side header flow paths 6X, the branching flow paths 7, and the other side header flow paths 6Y among the entire flow path layers 5, whereby pressure loss can be suppressed while making the size of the heat exchange core 1 small.

Figure 7:
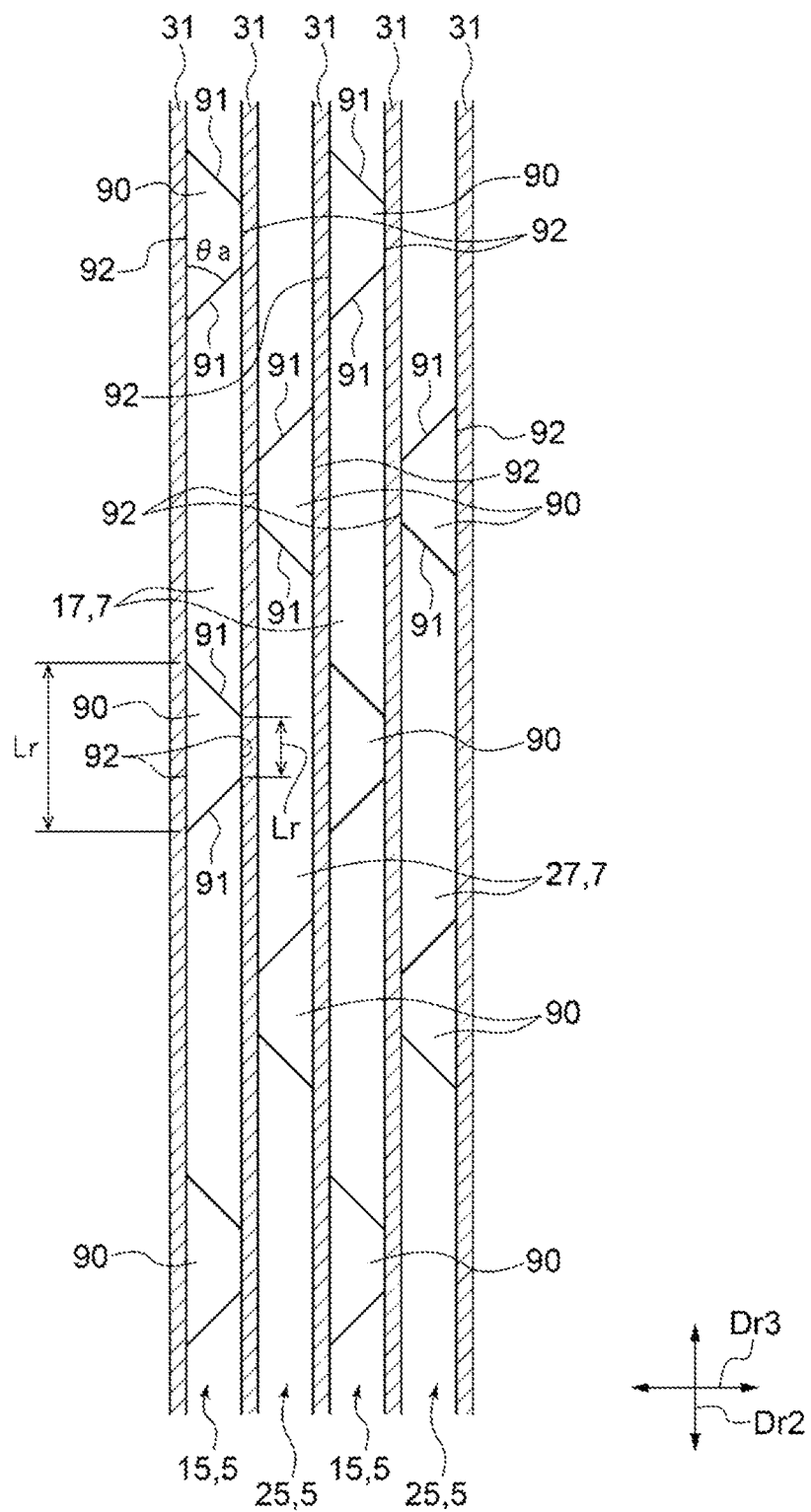
FIG. 7 is a cross-sectional view taken along the line indicated by arrows VII-VII in FIG. 2.

FIG. 7 is a cross-sectional view taken along the line indicated by arrows VII-VII in FIG. 2.

In the heat exchange core 1 according to some embodiments, as illustrated in FIG. 7, at least a part of the plurality of branching flow paths 7 is preferably provided with a plurality of ribs 90 connected to each of a pair of interlayer partition walls 31 facing each other in the third direction Dr3, of the wall portions defining the branching flow paths 7.

With this configuration, the ribs 90 can increase the fluid contact area, whereby the heat exchange efficiency can be increased. Furthermore, the ribs 90 favorably disturb the flow of the fluid to provide effects such as suppression of development of a boundary layer in the wall surfaces of the interlayer partition wall 31 and the second inter-flow path partition wall 53, so that the heat transfer coefficient between the fluid and the interlayer partition wall 31 and the second inter-flow path partition wall 53 defining the branching flow paths 7 can be improved, whereby the heat exchange efficiency can be improved. Furthermore, the ribs 90 function as a reinforcing member of the interlayer partition wall 31, whereby the pressure resistance performance of the interlayer partition wall 31 can be improved.

In the heat exchange core 1 according to some embodiments, as illustrated in FIG. 7, both end surfaces 91 of the ribs 90 in the second direction Dr2 may be inclined surfaces that are inclined with respect to the second direction Dr2. Furthermore, the ribs 90 may have a connection portion 92 connected to one of the pair of interlayer partition walls 31 and a connection portion 92 connected to the other one of the interlayer partition walls 31 having different lengths in the second direction Dr2.

With this configuration, when the heat exchange core 1 is formed by the additive manufacturing method with the second direction Dr2 being the stacking direction of the additive manufacturing method for example, one of the both end surfaces 91 described above, serving as an overhang portion, is inclined with respect to the stacking direction of the additive manufacturing. Thus, the both end surfaces 91 described above can be formed without forming a support portion for the additive manufacturing.

Note that as viewed in the first direction Dr1, an overhang angle of the both end surfaces 91 in a state where the extending direction of the both end surfaces 91 matches the second direction Dr2 is assumed to be 0 degrees, and an overhang angle θa of the both end surfaces 91 in a state where the extending direction of the both end surfaces 91 matches the third direction Dr3 is assumed to be 90 degrees. In the heat exchange core 1 according to some embodiments, the overhang angle θa of the both end surfaces 91 is not less than 30 degrees and not greater than 60 degrees, preferably not less than 40 degrees and not greater than 50 degrees, and more preferably 45 degrees.

In the heat exchange core 1 according to some embodiments, as illustrated in FIG. 7, the ribs 90 on one of the flow path layers 5 of two flow path layers 5 adjacent to each other in the third direction Dr3 and the ribs 90 on the other one of the two flow path layers 5 may be arranged with the connection portions 92 with a longer length Lr in the second direction Dr2 and the connection portions 92 with a shorter length Lr in the second direction Dr2 facing each other.

With the configuration, any of the ribs 90 on one flow path layer 5 and the other flow path layer 5 are connected to the interlayer partition wall 31 separating the one flow path layer 5 and the other flow path layer 5 via the connection portion 92 with the longer length Lr in the second direction Dr2 or via the connection portion 92 with the shorter length Lr in the second direction Dr2. Thus, a difference between the total area of the connection portions 92 on one flow path layer 5 side and the total area of the connection portion 92 on the other flow path layer 5 side can be suppressed in the interlayer partition wall 31. Thus, for example, the heat exchange core 1 can be formed by the additive manufacturing method with a relatively small difference between the impact, on the interlayer partition wall 31, of the thermal contraction of the plurality of ribs 90 in one of the flow path layers 5, and the impact, on the interlayer partition wall 31, of the thermal contraction of the plurality of ribs 90 in the other flow path layer 5. With this configuration, warpage of the interlayer partition wall 31 can be suppressed.

Figure 8A:
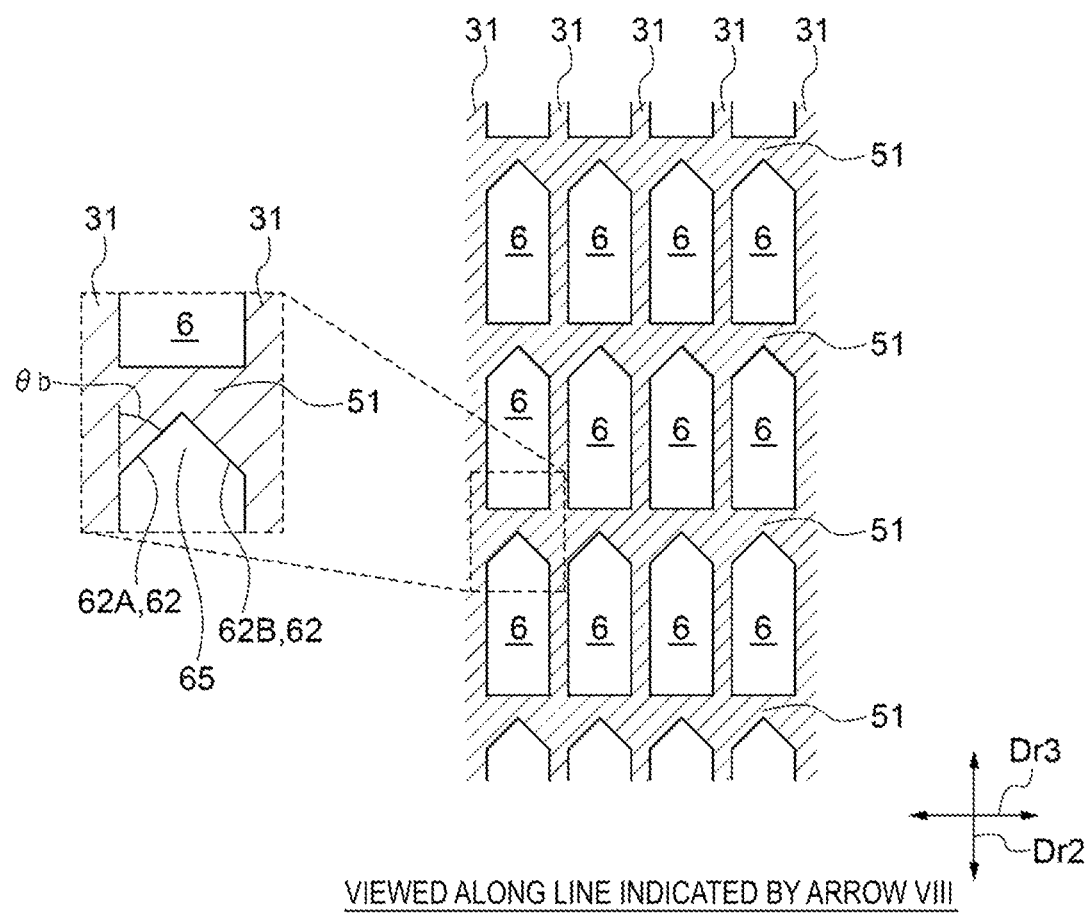
FIG. 8A is a cross-sectional view taken along the line indicated by arrow VIII in FIG. 2, schematically illustrating an example of a cross-sectional shape of an inner header flow path.

FIG. 8A is a cross-sectional view taken along the line indicated by arrow VIII in FIG. 2, schematically illustrating an example of a cross-sectional shape of the inner header flow path 6.

Figure 8B:
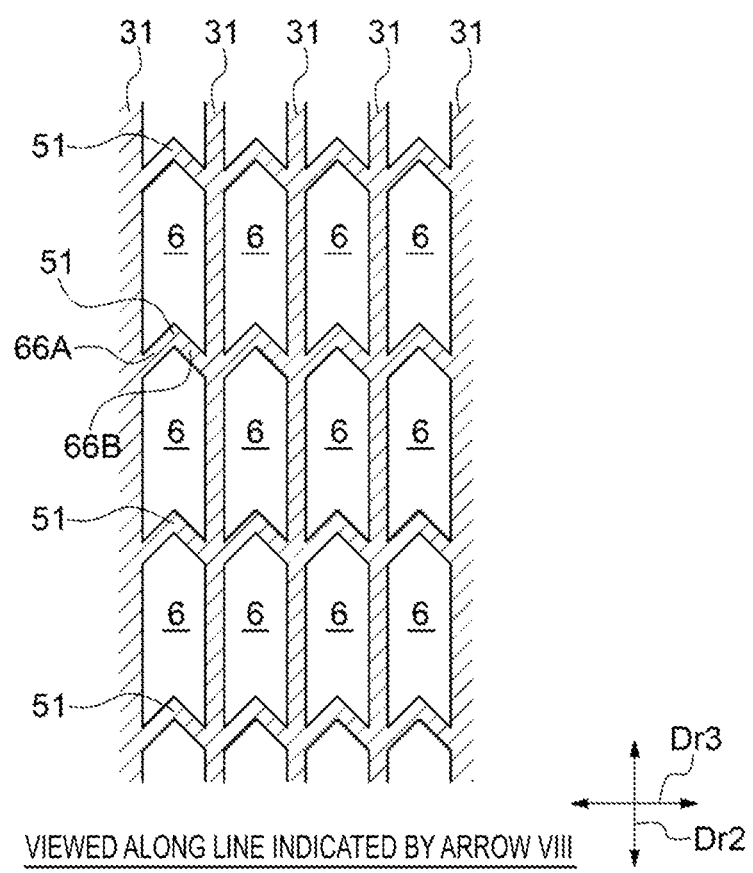
FIG. 8B is a cross-sectional view taken along the line indicated by arrow VIII in FIG. 2, schematically illustrating another example of the cross-sectional shape of the inner header flow path.

FIG. 8B is a cross-sectional view taken along the line indicated by arrow VIII in FIG. 2, schematically illustrating another example of the cross-sectional shape of the inner header flow path 6.

Figure 8C:
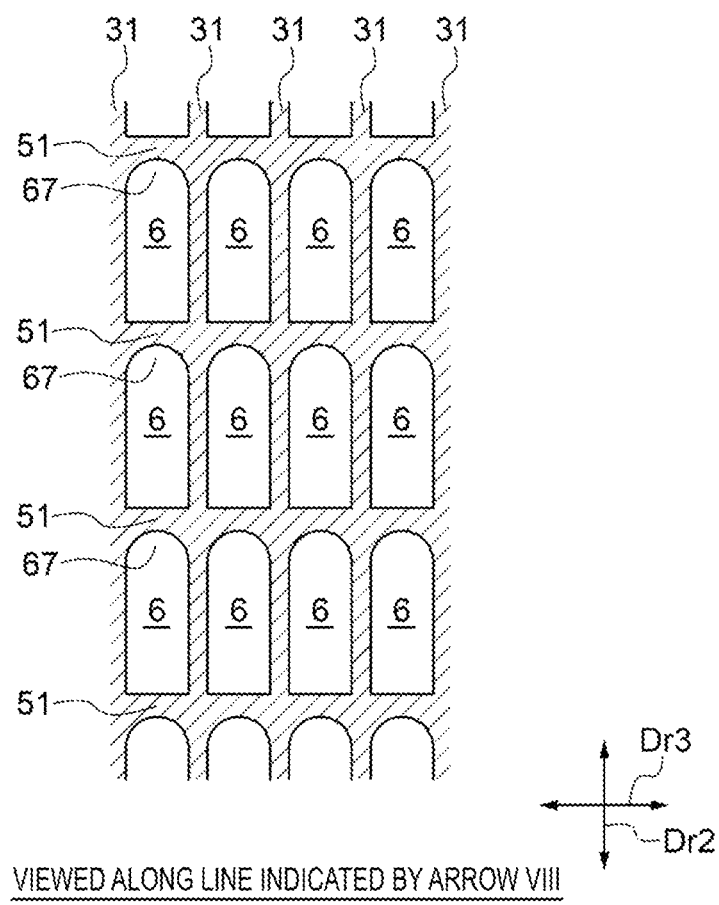
FIG. 8C is a cross-sectional view taken along the line indicated by arrow VIII in FIG. 2, schematically illustrating yet another example of the cross-sectional shape of the inner header flow path.

FIG. 8C is a cross-sectional view taken along the line indicated by arrow VIII in FIG. 2, schematically illustrating yet another example of the cross-sectional shape of the inner header flow path 6.

In the heat exchange core 1 according to some embodiments, as illustrated in FIG. 8A. FIG. 8B, and FIG. 8C, as viewed in the first direction Dr1, at least one of the pair of first inter-flow path partition walls 51 facing each other in the second direction Dr2 while sandwiching the inner header flow path 6 may include an inclined surface 62 inclined with respect to the second direction Dr2 or a curved surface 67.

With this configuration, when the heat exchange core 1 is formed by the additive manufacturing method with the second direction Dr2 being the stacking direction of the additive manufacturing method for example, the first inter-flow path partition wall 51 can be formed without forming a support portion for the additive manufacturing, even when the any one of the first inter-flow path partition walls 51 described above serves as the overhang portion.

In the heat exchange core 1 according to some embodiments, for example, as illustrated in FIG. 8A, an inner wall recess portion 65 of a triangular shape may be formed, in the first inter-flow path partition wall 51, by an inclined surface 62A and an inclined surface 62B that respectively extend from one side toward the other side (the right side in FIG. 8A for example) and from the other side toward the one side (the left side in FIG. 8A for example) in the third direction Dr3 while extending from one side toward the other side in the second direction Dr2 (the upper side in FIG. 8A for example).

In the heat exchange core 1 according to some embodiments, for example, as illustrated in FIG. 8B, the first inter-flow path partition wall 51 may be configured by an inclined wall 66A and an inclined wall 66B that respectively extend from one side toward the other side (the right side in FIG. 8A for example) and from the other side toward the one side (the left side in FIG. 8A for example) in the third direction Dr3, while extending from one side toward the other side in the second direction Dr2 (the upper side in FIG. 8A for example).

As viewed in the first direction Dr1, the overhang angle of the inclined surface 62A, 62B is 0 degrees in a state where the extending direction of the inclined surfaces 62A and 62B matches the second direction Dr2, and an overhang angle θb of the inclined surface 62A, 62B is 90 degrees in a state where the extending direction of the inclined surfaces 62A and 62B matches the third direction Dr3. In the heat exchange core 1 according to some embodiments, the overhang angle θb of the inclined surface 62A, 62B is not less than 30 degrees and not greater than 60 degrees, preferably not less than 40 degrees and not greater than 50 degrees, and more preferably 45 degrees.

In the heat exchange core 1 according to some embodiments, for example, an inner wall recess portion 67 having an arc-shaped concave surface may be formed as illustrated in FIG. 8C instead of the triangular inner wall recess portion 65 illustrated in FIG. 8A, for example.

The present disclosure is not limited to the above-described embodiments, and includes embodiments obtained by modifying the above-described embodiments and embodiments obtained by appropriately combining these embodiments.

The contents described in each of the above embodiments are understood as follows, for example.

(1) The heat exchange core 1 according to at least one embodiment of the present disclosure includes: the inner header flow path 6 as a header flow path extending in the first direction Dr1; and the plurality of branching flow paths 7 connected to the header flow path (inner header flow path 6) and extending in the second direction Dr2 intersecting with the first direction Dr1. The first angle θ1 formed by the header flow path (inner header flow path 6) with respect to the virtual connection plane 81 between the header flow path (inner header flow path 6) and the plurality of branching flow paths 7 is less than the second angle θ2 formed by the plurality of branching flow paths 7 with respect to the connection plane 81.

According to the configuration (1) described above, with the first angle θ1 thus set to be less than the second angle θ2, a flow path width W1 of the inner header flow path 6 connected to the connection plane 81 can be made less than the sum of flow path widths W2 of the plurality of branching flow paths 7 connected to the connection plane 81. Thus, the heat exchange core 1 can be downsized.

When the fluid flows from the inner header flow path 6 into each of the plurality of branching flow paths 7, because the sum of the flow path widths W2 of the plurality of respective branching flow paths 7 connected to the connection plane 81 is greater than the flow path width W1 of the inner header flow path 6 connected to the connection plane 81, variations in flow rate among the plurality of branching flow paths 7 are easily suppressed, and heat exchange efficiency is easily improved.

Therefore, the configuration (1) described above is suitable for realizing the heat exchange core 1 featuring a compact size and excellent heat exchange efficiency.

(2) In some embodiments, in the configuration (1) described above, the end portion (in-flow path end portion 53a) of the partition wall (second inter-flow path partition wall 53) separating the plurality of branching flow paths 7 may be positioned to be separated from the connection plane 81 in the second direction Dr2.

Through diligent research, the inventors have found out that with the in-flow path end portion 53a positioned to be separated from the connection plane 81 in the second direction, a difference, among the branching flow paths 7, in flow rate of the fluid flowing from the inner header flow paths 6 into the respective branching flow paths 7 can be suppressed.

With the configuration (2) described above, a difference in flow rate among the branching flow paths 7 can be suppressed.

(3) In some embodiments, in the configuration (2) described above, the distance L between the end portion (in-flow path end portion 53a) and the connection plane 81 may be 0.3 times or more and 2 times or less of the flow path width W1 of the header flow path (inner header flow path 6) as viewed in a direction orthogonal to the reference plane PR including the header flow path (inner header flow path 6) and the plurality of branching flow paths 7.

Through diligent research, the inventors have found out that with the distance L between the in-flow path end portion 53a and the connection plane 81 being 0.3 times or more and 2 times or less of the flow path width W1 of the inner header flow path 6 as viewed in a direction orthogonal to the reference plane PR (third direction Dr3), a difference, among the branching flow paths 7, in flow rate of the fluid flowing from the inner header flow paths 6 into the respective branching flow paths 7 can be effectively suppressed.

With the configuration (3) described above, a difference in flow rate among the branching flow paths 7 can be effectively suppressed.

(4) In some embodiments, in any one of the configurations (1) to (3) described above, the total area of the flow path cross-sectional areas S2 of the plurality of branching flow paths 7 may be larger than the flow path cross-sectional area S1 of the header flow path (inner header flow path 6) to which the plurality of branching flow paths 7 are connected.

With the configuration (4) described above, variations in flow rate among the plurality of branching flow paths 7 are easily suppressed.

(5) In some embodiments, any one of the configurations (1) to (4) described above may further include the flow path layer 5 including a plurality of the header flow paths (inner header flow paths 6) and a plurality of the branching flow paths 7 each connected to a corresponding one of the plurality of the header flow paths (inner header flow paths 6). The total area ΣS2 of the flow path cross-sectional areas S2 of the plurality of branching flow paths 7 included in the flow path layer 5 may be larger than the total area ΣS1 of the flow path cross-sectional areas S1 of the plurality of header flow paths (inner header flow paths 6) included in the flow path layer 5.

With the configuration (5) described above, improvement in the heat exchange efficiency of the heat exchange core 1 and the downsizing of the heat exchange core 1 can both be achieved.

(6) In some embodiments, in the configuration (5) described above, the plurality of header flow paths (inner header flow paths 6) may include the plurality of one side header flow paths 6X connected to the plurality of branching flow paths 7 on one side in the second direction Dr2, and the plurality of other side header flow paths 6Y connected to the plurality of branching flow paths 7 on the other side in the second direction Dr2. A total length Lt of the flow path lengths of the plurality of the one side header flow paths 6X, the plurality of branching flow paths 7 connected to the plurality of the one side header flow paths 6X, and the plurality of the other side header flow paths 6Y connected to the plurality of the one side header flow paths 6X via the plurality of branching flow paths 7 may be substantially equal among the flow path layers 5.

With the configuration (6) described above, a difference in flow rate among the branching flow paths 7 can be suppressed over the entirety of the flow path layers 5.

(7) In some embodiments, in the configuration (6) described above, one side end portions (one side open ends 61X) of the plurality of one side header flow paths 6X on the side opposite to the connection plane 81 may be positioned on the side opposite to other side end portions (other side open ends 61Y) of the plurality of other side header flow paths 6Y on the side opposite to the connection plane 81, in the first direction Dr1.

The configuration (7) described above achieves a reasonable flow path layout for achieving substantially the same total length of the flow path lengths of the one side header flow paths 6X, the branching flow paths 7, and the other side header flow paths 6Y among the entire flow path layers 5, whereby pressure loss can be suppressed while making the size of the heat exchange core 1 small.

(8) In some embodiments, in any one of the configurations (1) to (7) described above, at least a part of the plurality of branching flow paths 7 is provided with the plurality of ribs 90 connected to each of a pair of wall portions (interlayer partition walls 31) facing each other in a direction (third direction Dr3) orthogonal to the reference plane PR including the plurality of the header flow paths (inner header flow path 6) and the plurality of branching flow paths 7, of wall portions defining the plurality of the branching flow paths 7.

With the configuration (8) described above, the ribs 90 can increase the fluid contact area, whereby the heat exchange efficiency can be increased. Furthermore, the ribs 90 favorably disturb the flow of the fluid to provide effects such as suppression of development of a boundary layer in the wall surfaces of the wall portions described above, so that the heat transfer coefficient between the fluid and the interlayer partition wall 31 and the second inter-flow path partition wall 53 serving as the wall portions defining the branching flow paths 7 can be improved, whereby the heat exchange efficiency can be improved. Furthermore, the ribs 90 function as a reinforcing member of the interlayer partition wall 31, whereby the pressure resistance performance of the interlayer partition wall 31 can be improved.

(9) In some embodiments, in the configuration (8) described above, both end surfaces 91 of each of the plurality of the ribs 90 in the second direction Dr2 are inclined surfaces that are inclined with respect to the second direction Dr2, and each of the plurality of the ribs 90 has the connection portion 92 connected to one of the pair of wall portions (interlayer partition walls 31) and the connection portion 92 connected to the other of the wall portions (interlayer partition walls 31), the connection portions 92 having different lengths in the second direction Dr2.

With the configuration (9) described above, when the heat exchange core 1 is formed by the additive manufacturing method with the second direction Dr2 being the stacking direction of the additive manufacturing method for example, one of the both end surfaces 91 described above, serving as an overhang portion, is inclined with respect to the stacking direction of the additive manufacturing. Thus, with the configuration (9) described above, the both end surfaces 91 can be formed without forming a support portion for the additive manufacturing.

(10) In some embodiments, the configuration (9) described above may further include a plurality of the flow path layer 5 including a plurality of the header flow paths (inner header flow paths 6) and a plurality of the branching flow paths 7 each connected to a corresponding one of the plurality of the respective header flow paths (inner header flow paths 6). The plurality of the flow path layers 5 are arranged overlapping each other in the orthogonal direction described above (third direction Dr3), and the plurality of ribs 90 on one of two of the plurality of flow path layers 5 adjacent to each other in the orthogonal direction (third direction Dr3) and the plurality of ribs 90 on another of the two of the plurality of flow path layers 5 may be arranged with the connection portions 92 having a longer length Lr in the second direction and the connection portions 92 having a shorter length Lr in the second direction Dr2 facing each other.

With the configuration (10) described above, any of the ribs 90 on one flow path layer 5 and the other flow path layer 5 are connected to the wall portion (interlayer partition wall 31) separating the one flow path layer 5 and the other flow path layer 5 via the connection portion 92 with the longer length in the second direction Dr2 or via the connection portion 92 with the shorter length in the second direction Dr2. Thus, a difference between the total area of the connection portions 92 on one flow path layer 5 side and the total area of the connection portion 92 on the other flow path layer 5 side can be suppressed in the wall portion (interlayer partition wall 31). Thus, for example, the heat exchange core 1 can be formed by the additive manufacturing method with a relatively small difference between the impact, on the wall portion (interlayer partition wall 31), of the thermal contraction of the plurality of ribs 90 in one of the flow path layers 5, and the impact, on the wall portion (interlayer partition wall 31), of the thermal contraction of the plurality of ribs 90 in the other flow path layer 5. With this configuration, warpage of the wall portion (interlayer partition wall 31) can be suppressed.

(11) In some embodiments, in any one of the configurations (1) to (10) described above, as viewed in the first direction Dr1, at least one of the pair of wall portions (first inter-flow path partition walls 51) facing each other in the second direction Dr2 while sandwiching each of the plurality of header flow paths (inner header flow path 6) may include the inclined surface 62 inclined with respect to the second direction Dr2 or the curved surface 67.

With the configuration (11) described above, when the heat exchange core 1 is formed by the additive manufacturing method with the second direction Dr2 being the stacking direction of the additive manufacturing method for example, the wall portion (first inter-flow path partition wall 51) can be formed without forming a support portion for the additive manufacturing, even when the any one of the wall portion (first inter-flow path partition walls 51) serves as the overhang portion.

(12) The heat exchanger 3 according to at least one embodiment of the present disclosure includes the heat exchange core 1 with any one of the configurations (1) to (11) described above.

Therefore, with the configuration (12) described above, the heat exchanger 3 featuring a compact size and excellent heat exchange efficiency can be realized.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A heat exchange core comprising:
a header flow path extending in a first direction; and
a plurality of branching flow paths connected to the header flow path and extending in a second direction intersecting with the first direction, wherein
a first angle formed by the header flow path with respect to a virtual connection plane between the header flow path and the plurality of branching flow paths is less than a second angle formed by the plurality of branching flow paths with respect to the connection plane, an end portion of a partition wall separating the plurality of branching flow paths is positioned to be separated from the connection plane in the second direction, and a distance between the end portion and the connection plane is 0.3 times or more and 2 times or less of a flow path width of the header flow path as viewed in a direction orthogonal to a reference plane including the header flow path and the plurality of branching flow paths.

2. The heat exchange core according to claim 1, wherein a total area of flow path cross-sectional areas of the plurality of branching flow paths is larger than a flow path cross-sectional area of the header flow path to which the plurality of branching flow paths are connected.

3. The heat exchange core according to claim 1, further comprising:

a flow path layer including a plurality of the header flow paths and a plurality of the branching flow paths each connected to a corresponding one of the plurality of the header flow paths, wherein a total area of flow path cross-sectional areas of the plurality of the branching flow paths included in the flow path layer is larger than a total area of flow path cross-sectional areas of the plurality of the header flow paths included in the flow path layer.

4. The heat exchange core according to claim 3, wherein the plurality of the header flow paths include a plurality of one side header flow paths connected to the plurality of the branching flow paths on one side in the second direction, and a plurality of other side header flow paths connected to the plurality of the branching flow paths on another side in the second direction, and a total length of flow path lengths of the plurality of the one side header flow paths, the plurality of the branching flow paths connected to the plurality of one side header flow paths, and the plurality of other side header flow paths connected to the plurality of one side header flow paths via the plurality of the branching flow paths is substantially equal among the flow path layers.

5. The heat exchange core according to claim 4, wherein one side end portions of the plurality of one side header flow paths on a side opposite to the connection plane are positioned on a side opposite to other side end portions of the plurality of other side header flow paths on the side opposite to the connection plane, in the first direction.

6. The heat exchange core according to claim 1, wherein, as viewed in the first direction, at least one of a pair of wall portions facing each other in the second direction while sandwiching each of the plurality of header flow paths includes an inclined surface inclined with respect to the second direction or a curved surface.

7. A heat exchanger comprising the heat exchange core according to claim 1.

* * * * *